United States Patent [19]

Loriot et al.

[11] Patent Number: 4,678,924
[45] Date of Patent: Jul. 7, 1987

[54] METHOD OF SETTING A STOP MEANS INSIDE OF A TUBULAR ELEMENT

[75] Inventors: Pierre Loriot, Venelles; Michel Rendu; Jean Rousseau, both of Aix en Provence; Alain Samoel, Manosque, all of France

[73] Assignee: Commissariat a l'Energie Atomique, Paris, France

[21] Appl. No.: 751,431

[22] Filed: Jul. 3, 1985

Related U.S. Application Data

[63] Continuation-in-part of Ser. No. 418,180, Sep. 14, 1982, abandoned.

[30] Foreign Application Priority Data

Sep. 30, 1981 [FR] France ............................... 81 18414

[51] Int. Cl.⁴ .............................................. G21C 21/00
[52] U.S. Cl. ..................................... 29/407; 29/400 N; 29/445; 29/517; 376/261; 376/412; 376/420
[58] Field of Search ............... 376/412, 420, 413, 424, 376/425, 418, 419, 453, 261, 451, 260; 29/515, 516, 517, 407, 464, 467, 400 N, 723, 445

[56] References Cited

U.S. PATENT DOCUMENTS

| | | |
|---|---|---|
| 3,125,493 | 3/1964 | D'Amore .............................. 376/420 |
| 3,260,649 | 7/1966 | Jens et al. ............................. 376/420 |
| 3,291,700 | 12/1966 | Brossa et al. ......................... 376/412 |
| 3,378,457 | 4/1968 | Davidson et al. .................... 376/420 |
| 3,392,438 | 7/1968 | Coulter et al. ....................... 376/451 |
| 3,607,638 | 9/1971 | Seim .................................... 376/412 |
| 3,702,282 | 11/1972 | Gatley et al. ......................... 376/451 |
| 3,801,087 | 4/1974 | Akaike et al. ........................ 29/517 |
| 3,816,248 | 6/1974 | Cayol et al. ......................... 376/451 |
| 3,883,942 | 5/1975 | Fichter, Jr. et al. ................. 29/517 |
| 4,391,771 | 7/1983 | Anthony .............................. 376/451 |
| 4,509,245 | 4/1985 | Barth et al. .......................... 29/525 |
| 4,520,548 | 6/1985 | Kremser et al. ..................... 29/509 |

FOREIGN PATENT DOCUMENTS

| | | | |
|---|---|---|---|
| 1910432 | 9/1970 | Fed. Rep. of Germany | ...... 376/420 |
| 1219264 | 1/1971 | United Kingdom | ................ 376/420 |

Primary Examiner—Charles T. Jordan
Assistant Examiner—Daniel Wasil

[57] ABSTRACT

Fuel and fertile rod for a nuclear reactor. It comprises a can, a column of fissile and/or fertile pellets within the can and end plugs welded to the two ends of the can. The column of pellets is held in place by two tubular spacers of limited thickness and with rounded edges abutting against the two ends of the fuel column and set with a fixed dimension to the can. The column of fissile and fertile pellets can also be held in place by a supplementary positioning setting of the fertile pellet column.

2 Claims, 11 Drawing Figures

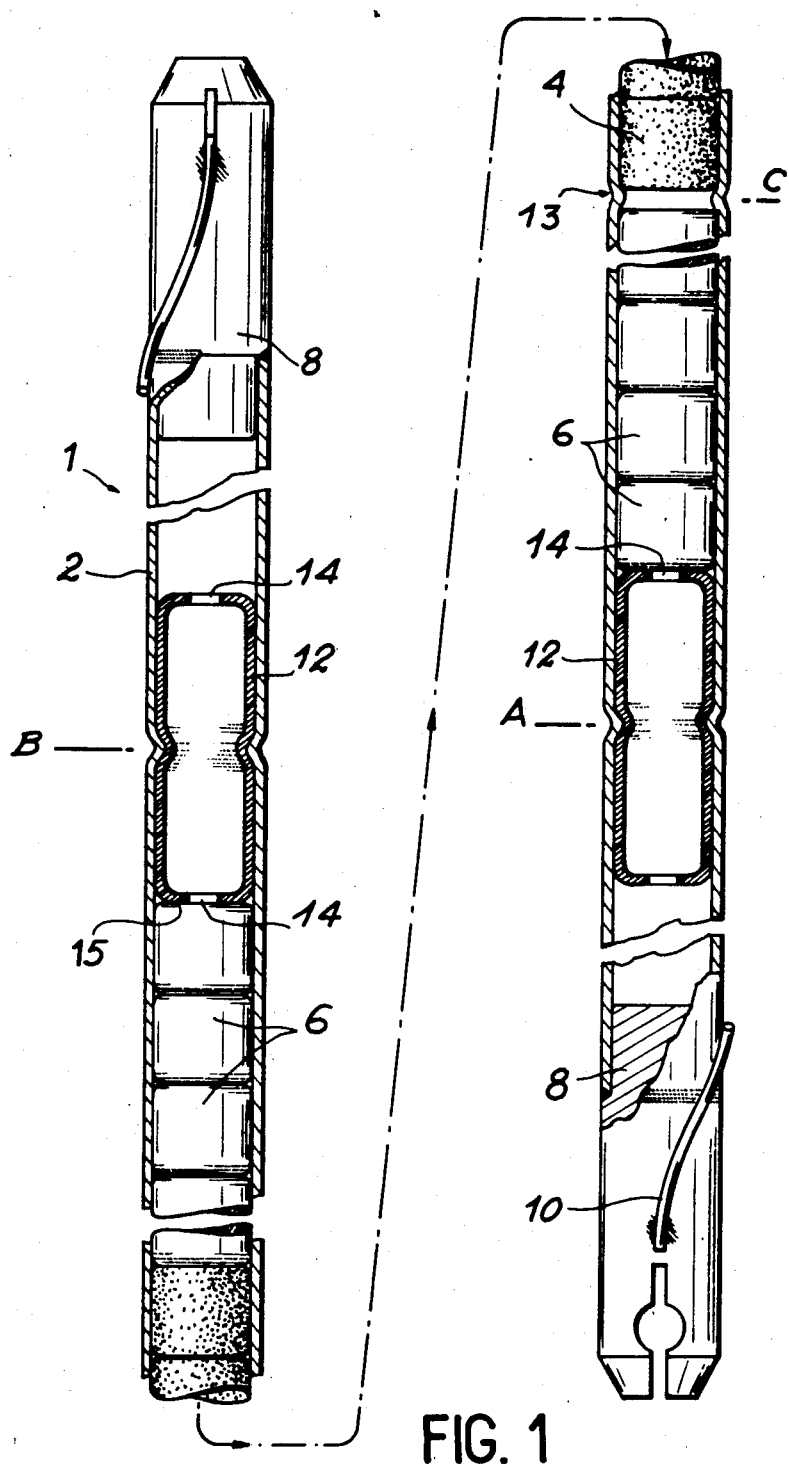
FIG. 1

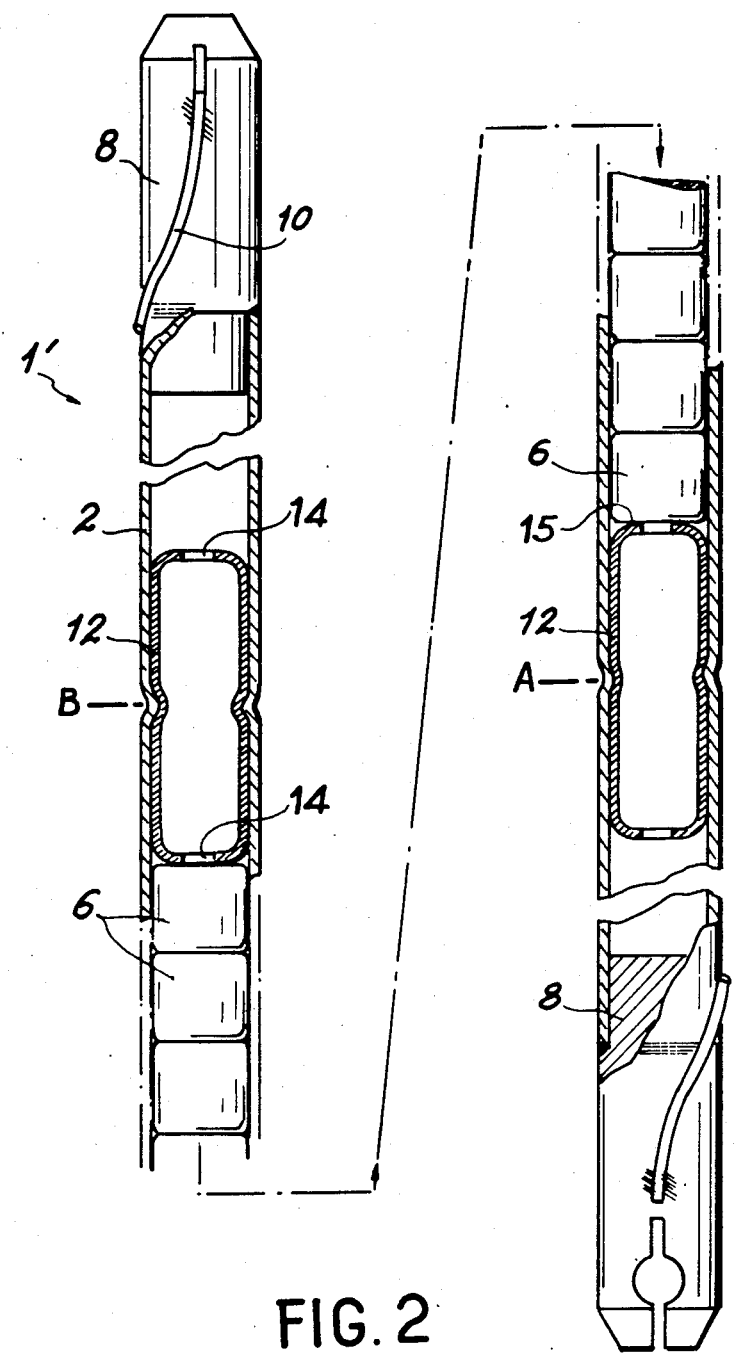
FIG. 2

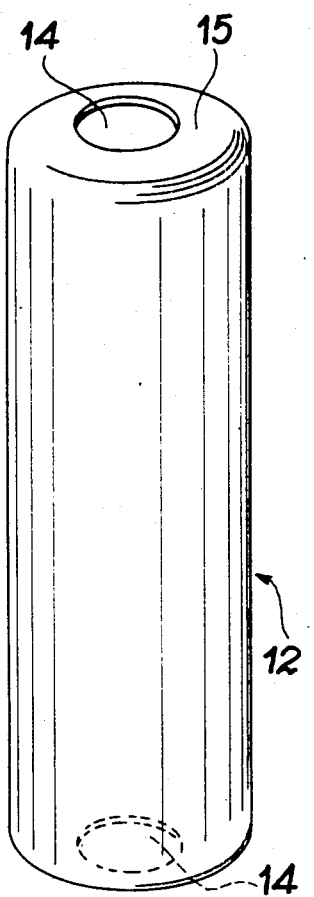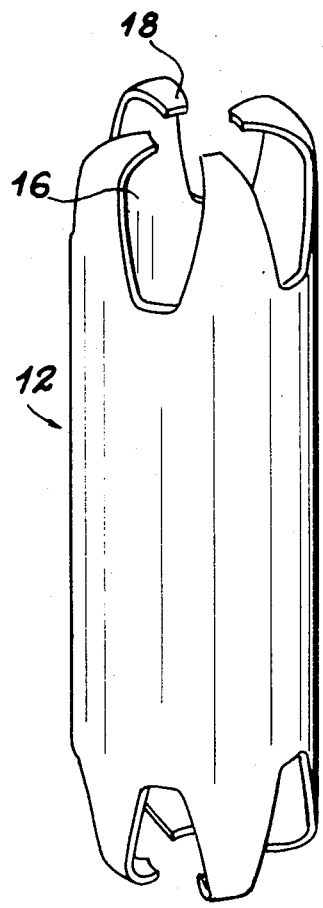
FIG. 3   FIG. 4

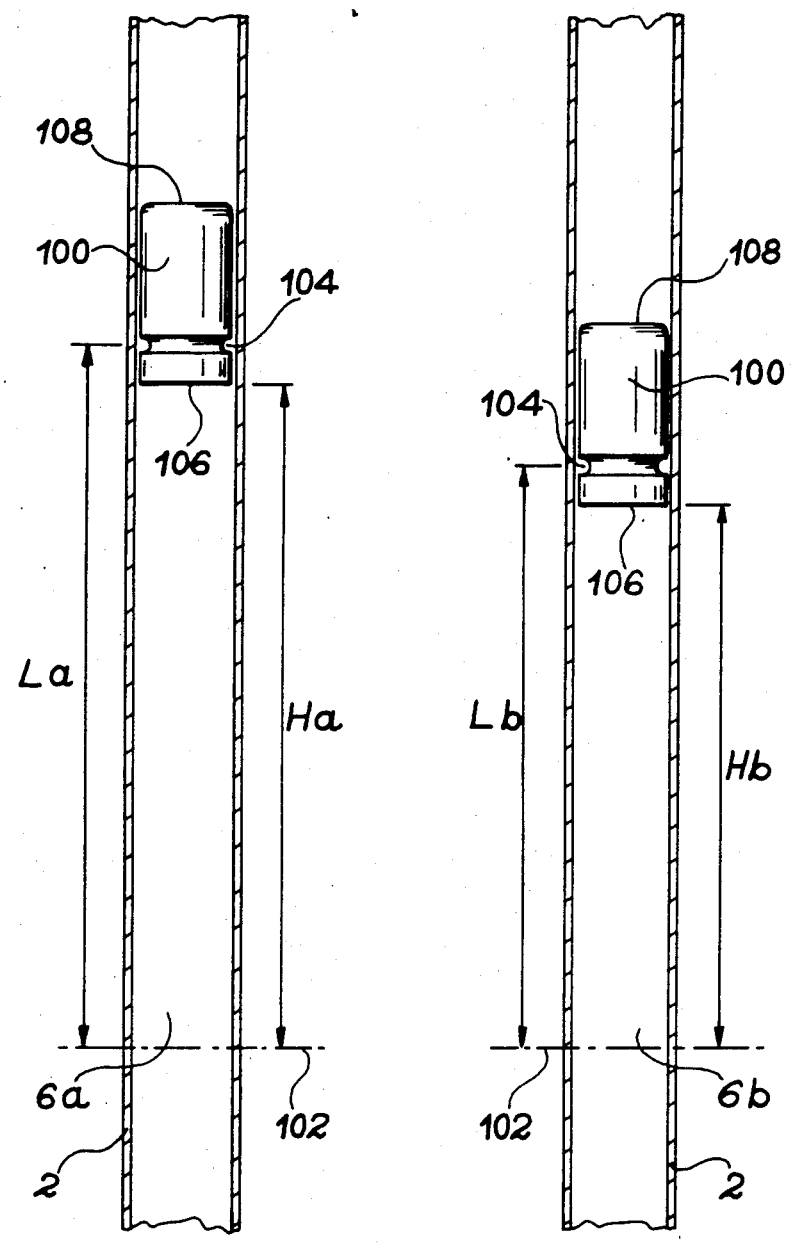
PRIOR ART
FIG. 5
PRIOR ART
FIG. 6

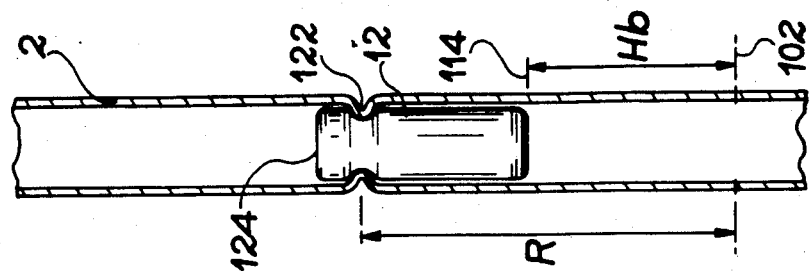
FIG. 11
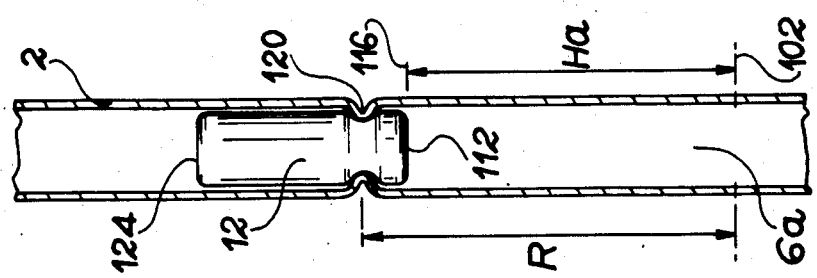
FIG. 10
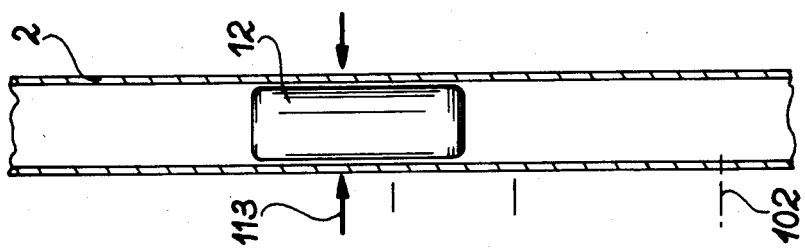
FIG. 9
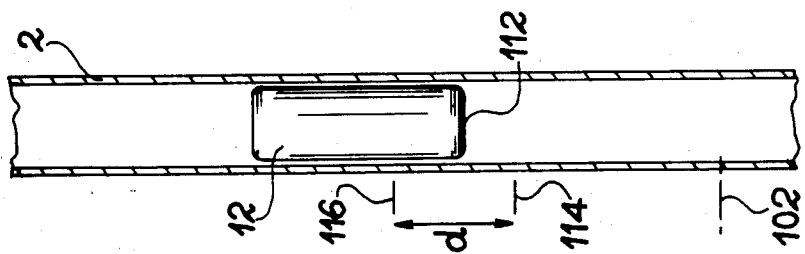
FIG. 8
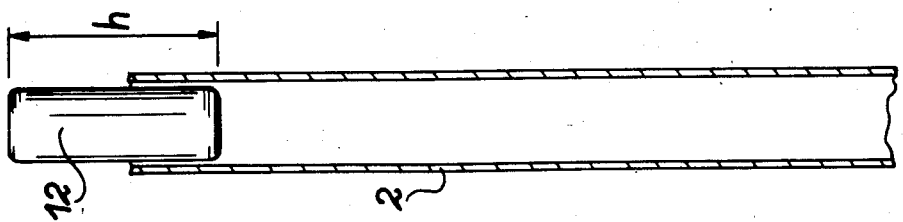
FIG. 7

METHOD OF SETTING A STOP MEANS INSIDE OF A TUBULAR ELEMENT

BACKGROUND OF THE INVENTION

This invention is a continuation-in-part of U.S. Ser. No. 418,180 filed Sept. 14, 1982.

The invention relates to a method of setting a stop means inside of a tubular element having a certain length. A great number of cases are known in industry, in which a stop means must be set within a tubular element. Particularly in the nuclear industry, the nuclear reactor fuel rods, particularly fast neutron fuel rods, are generally constituted by a metal sheath within which fissile and fertile pellets are situated, while the fuel rods are constituted by a sheath within which there is only one column of fertile pellets. It is necessary to provide for holding the column of pellets in position inside of the sheath.

This is accomplished by means of at least two stop means, one being disposed at each of the ends of the column of pellets and abutting against this column. A stop means can also be disposed in the center of this column of pellets.

In the prior art there have been known different embodiments of tubular elements, for example nuclear reactor fuel rod sheaths having a stop means integral with this tubular element.

The U.S. Pat. No. 3,260,649 to Jens discloses a fuel rod of a nuclear reactor consisting of a stainless steel outer tube, which encloses a plurality of aligned fuel pellets, and a plurality of blanket pellets at the bottom of the fuel rod. Tungsten segmenting disks are fixed within the tube to separate fuel pellets. Each segmenting disk is provided with an annular groove and fixed to the outer tube by means of a setting operation of the tube at the level (along the length of the tube) of the segmenting disk annular groove.

However, in a rod of this type, the outer tube setting position depends on the position of the annular groove made in the segmenting disk. Consequently, to affix this segmenting disk to the outer tube it is necessary first to detect the position of this annular groove in the segmenting disk along the length of the tube, and, in a second operation, to adjust the position of the setting machine tool according to the detected position of the annular groove in the segmenting disk.

This process has the disadvantage that it is necessary to adjust the machine for each rod. Indeed, the fuel pellets, like any manufactured object, have a length which is subject to manufacturing irregularities. Now, the annular groove in the segmenting disk is formed in this disk prior to its introduction into the tube. In other words, this means that the disks are manufactured and the annular groove is machined into the periphery of the disk, like separate pieces which are then introduced and set in this state into the outer tube. In the rod described by Jens, the segmenting disk has very little height in relation to its diameter. However, assuredly the stop means constituted by this segmenting disk could be configured such as to have a relatively great length in relation to its diameter, and the annular groove could be machined at any point along this length. However, it is obvious that the position of the annular groove along the length of the stop means is fixed, since the said groove is machined beforehand. Consequently, when a stop or segmenting means of this type is placed in contact with a fuel pellet, the position of the annular groove relative to the annular tube depends on the length of the fuel pellet on the one hand, this length being subject to irregularities of production, and on the shape of the stop of segmenting means on the other, the position of the annular groove along the length of this element being also subject to production irregularities. Consequently, at the time of performing the operation of setting the outer tube at the level of the annular groove in the stop or segmenting means, the position of the annular groove is not known in advance.

It is therefore necessary to adjust the machine for each fuel rod and, more precisely, for each setting operation on each stop or segmenting means. It is obvious that the result is the need for additional time for performing this setting operation and, consequently, the cost of this operation is increased.

The subject matter of the present invention is a process for setting a stop means or segmenting means inside of a tubular element, which will remedy the drawbacks described above.

More precisely, the invention relates to a method of setting a detent means inside of a tubular element having a length, characterized in that, the said stop means is a hollow cylinder of deformable but undeformed walls;

the said tubular element has a deformable wall, but it is likewise undeformed;

and in that it includes the following successive steps:

introduction of an undeformed stop means into a tubular element;

positioning the said undeformed stop means inside of the tubular element between two predetermined positioning limits;

performing a simultaneous operation of setting the tubular element and the stop means at a predetermined position along the length of the said tubular element;

the stop means having a length at least equal to the distance between the two said predetermined limits.

In the method of the invention, first of all, a particular type of spacer is used. This spacer is in the form of a hollow cylindrical element having walls sufficiently thin to be deformable, this deformation being plastic, meaning that the stop means does not recover its initial shape after deformation, for example by a setting operation.

Moreover, the spacer or stop means has a length which is at least equal to a minimum length, this minimum length being equal to the distance d between two predetermined limits for the positioning of the stop means inside of the tubular element, for example an upper limit and a bottom limit.

The stop means is introduced into the tubular element in its undeformed state, which means that it has no annular groove along its length. Due to this feature, after the operation of introducing the stop means, the annular setting groove in the outer tube is made at a predetermined position, that is to say, a position independent of the actual position and any position of the spacer within the domain defined by the lower and upper predetermined limits of the positions of the stop means within the tubular element.

Lastly, it is to be noted that the setting operation is performed simultaneously on the sheath or tubular element and on the stop means.

Owing to these provisions, it will be understood that the annular setting groove is made on the tubular element at a predetermined position, that is, at a position that is independent, in the case for example of a nuclear reactor fuel rod, of the actual height of the column of pellets, this height being subject to variations arising out of the cumulative manufacturing irregularities in the said fuel pellets constituting the said columns.

BRIEF DESCRIPTION OF THE DRAWINGS

The invention is described in greater detail hereinafter, relative to non-limitative embodiments and with reference to the attached drawings, wherein show:

FIG. 1 an overall view in two parts of a fuel rod of a nuclear reactor according to the invention.

FIG. 2 an overall view in two parts of a fertile rod of a nuclear reactor according to the invention.

FIG. 3 a first embodiment of a spacer for locking the column of pellets in a rod according to the invention.

FIG. 4 a second embodiment of a deformable spacer used in a rod according to the invention.

FIGS. 5 and 6 illustrate a setting method of the prior art.

FIGS. 7 to 9 show the different steps of a setting process in accordance with the invention.

FIGS. 10 and 11 represent two examples of a nuclear reactor fuel rod after the setting of a detent element in accordance with the method of the invention.

DETAILED DESCRIPTION OF THE PREFERRED EMBODIMENTS

The fuel rod of FIG. 1, where it is designated by reference numeral 1, is constituted by a thin-walled metal can 2, whose length is considerable compared with its diameter. Within the can 2 are stacked fissile 4 and fertile 6 fuel pellets. The can is sealed at both of its ends by a plug 8 welded to the can. A wire 10 spirally wound around can 2 ensures the spacing of the fuel rods of one and the same assembly.

Rod 1' of FIG. 2 is a fertile rod. Like the fuel rod of FIG. 1, it is constituted by a thin-walled metal can 2. However, it only contains fertile pellets 6 and is sealed at both of its ends by a plug 8 welded to can 2.

According to the invention, at both ends the pellets are held in place by tubular spacers 12 and by a supplementary positioning setting of the fertile column for the fuel rod. The ends of spacers 12 are rounded, cf. FIG. 3, in order to constitute a planar bearing surface for the pellets. The holes 14 on surfaces 11 permit the passage of gases given off by the fissile reaction occurring during the operation of the nuclear reactor. Spacers 12 abut above and below the column of pellets and are set with can 2. This setting is carried out from the outside, e.g., by isostatic or mechanical deformation (knurling). Thus, the spacers 12 are locked in translation with respect to the can. In this way, the column of fissile and-/or fertile pellets is held in place. As a result of the fitting clearances with respect to the pellets, the fertile or fuel rod according to the invention is able to withstand, without any risk of fracture, the stresses due to the differential expansions which occur, particularly during the first rise in power of the nuclear reactor. Under permanent operating conditions, these rods have a behavior which is identical to that of the prior art rods in which the column is maintained in place by a spring device.

However, in the case of accidental conditions, it is possible to optionally limit the risk of placing the can under tension by means of spacers 12 of the type shown in FIG. 4. The spacer, shown in perspective view, has a certain number of indentations 16 arranged longitudinally at the two ends in the tube wall. These indentations leave in relief the tongues 18, which are deformable under the effect of the thrust resulting from the expansion of the column of pellets. The deformation of tongues 18 limits the stresses transmitted to the can.

The invention also relates to a process for producing the fuel or fertile rods described hereinbefore.

This process has two variants, according to the type of rod. Thus, it is known that the core of a fast neutron nuclear reactor is essentially constituted by fuel and fertile assemblies respectively containing a group of fuel rods and a group of fertile rods. In their central part, the fuel rods have a column of fissile pellets and, above and below said fissile pellet column, an upper axial cover and a lower axial cover of fertile pellets. The fertile rods only have fertile pellets. In view of the fact that the fertile rods do not contain plutonium, these two types of rods are produced in different ways. As plutonium is highly toxic, it must be handled in glove boxes in a controlled atmosphere (neutral gas) enclosure. Throughout the remainder of the present text, such an enclosure will be called a controlled zone. However, the fertile pellets made from unenriched uranium oxide can be handled under air in a ventilated hood. It is therefore advantageous to bring about a separating between the operations which can and can not be performed in said zone.

According to the process of the invention, the following successive operations are performed for producing a fuel rod having fissile and fertile pellets.

The can is set at a mark C located in the vicinity of the upper end of the column of fertile pellets 6 forming the lower axial cover of the rod in order to maintain said column in a fixed position (cf. FIG. 1). The effect of this setting is to position the fertile pellets, which are introduced by the lower end of can 2. A lower spacer 12 is brought into contact with the fertile column and the can is set with the spacer at the fixed mark A. The length of spacer 12 is sufficient for it to be always possible to set it with the can at said fixed mark A with respect to the said can, bearing in mind the variations of length of the fertile column resulting from the manufacturing tolerances of the pellets. The setting of spacer 12 immobilizes the fertile column, apart from the fitting clearance. It is therefore possible to introduce the lower plug 8 and weld it without any particular difficulty, because no force is exerted on said plug. The weld bead is then inspected.

All the operations described hereinbefore involve no handling of plutonium and can therefore be carried out outside a controlled zone. As a result of the setting at mark C, the assembly can be easily manipulated and transported into the controlled zone, where the production of the fuel rod continues in a glove box.

In the controlled zone, the fissile pellets 4 are introduced through the upper part of can 2. Upper fertile pellet 6 and then upper spacer 12 in contact with the fertile column are introduced above the fissile column. The can and the spacer are set at fixed mark B. In the same way as described hereinbefore in connection with the lower spacer 12, the height of the upper spacer 12 makes it possible to take account of the tolerances on the total height of the stack of pellets. Upper plug 8 is introduced, welded, and the performance of the weld is checked.

The process according to the invention also applies to the production of fertile rods. In this case, the rod only has a single type of pellet and it is no longer necessary to set the can with a fixed mark C. Moreover, all the operations can be carried out outside a controlled zone, so that production is facilitated. The first part of production can be carried out outside the enclosure and under air. Fitting can take place either from the bottom or from the top of a rod and the following operations are involved: Spacer 12 is introduced, followed by the setting of the spacer and the can at a first fixed mark A or B. The upper or lower plug is introduced, as a function of the side by which the spacer has been introduced and set. The plug is welded and the weld is inspected. The fertile pellets are introduced, followed by a second spacer, which is brought into contact with the fertile fuel column. The said spacer is set at a second fixed mark B or A.

Production is ended by connecting the open end of the rod to a vacuum installation in order to evacuate the residual air contained in the rod. A controlled atmosphere is then established within the enclosure, e.g., using helium. The second plug 8 is fitted, welded, and its weld checked.

In FIGS. 5 and 6 there are represented two longitudinal cross-sectional views of a nuclear reactor fuel rod, wherein a stop means or segmenting means is affixed to a tubular element constituted by a "can" or sheath, in accordance with a method of the prior art.

In FIGS. 7 to 9 there are represented the different steps of a method for affixing a stop means or segmenting means to a tubular element by a method of the invention.

In FIGS. 10 and 11 are shown two embodiments of a nuclear reactor fuel rod after completing the fixation of a spacer constituting the stop means for a can constituting a tubular element. In FIG. 10, the stop means is positioned at the level of the bottom positioning limit, and in FIG. 11 this stop means is positioned at the level of the upper positioning limit.

In FIGS. 5 and 6 there are represented two fuel rods made by a method of the prior art, each having one column of pellets 6a (FIG. 5) and 6b (FIG. 6) of different heights.

The two rods are made by the same method. Each rod is constituted by a tubular element 2 forming a can with deformable walls. At a certain point along the length of this can a reference level or mark has been provided, designated by reference 102. This reference level can be materialized or not; for example it can be materialized by a slight indentation of the can such that the inner wall of the can projects slightly inwardly so as to constitute a fixed abutment against which the pellets come to rest. It is apparent, however, that it is not necessary that this reference line be materialized.

Beginning at the reference numeral 102, one or more nuclear reactor fuel pellets have been arranged, these pellets being above to be fissile or fertile. However, it is readily apparent that a nuclear reactor pellet, like any manufactured article, has a height which is subject to manufacturing tolerances. Consequently, the heights Ha of the column of pellets 6a and Hb of the column of pellets 6b are subject to variations.

For instance, if the fuel pellets column is comprised of 100 fuel pellets, each pellet having a length of 10±0.2 mm, the length of the fuel pellets column will be 1000 mm±20 mm, i.e., 980 and 1020 mm will be included.

In FIG. 5 there is represented a column of pellets 6a whose height Ha is close to the maximum height, taking into account the manufacturing tolerances on the height of a pellet. In other words, this height is close to 1020 mm. On the other hand, a column of pellets 6b is represented in FIG. 6, whose height Hb is close to the minimum height, taking into account the manufacturing tolerances. In other words, Hb is close to 980 mm. It is therefore found that there is a difference of close to 40 mm between Ha and Hb. On top of each of the columns of pellets 6a and 6b there has been inserted a stop means or segmenting means 100, these means being identical in the case of FIGS. 5 and 6. Each stop means comprises a groove 104 made—for example cut on a lathe—at a predetermined level along the length of this stop means. In the embodiment represented, the annular groove is in the lower third of the height of the said means. However, it is apparent that this groove could be formed at any point along this height without modifying the present reasoning.

But, however this may be, the distance between the bottom face 106 and the annular groove 104 of each of the stop means 100 is invariable, each of these means being machined prior to its insertion into the tubular element 2, with a constant distance between the face 106 and the annular groove 104.

It is also evident that a stop means 100 could be inserted inversely. In this case, the distance between the face 108, which would then be in contact with the upper end of each of the columns of pellets 6a and 6b, would be modified. However, this does not change the fact that the distance between the upper end of the column of pellets 6a or 6b and groove 104, or more precisely a median plane passing through the center of this groove, is constant, with the exception of the manufacturing tolerances of the stop means.

Consequently, the lengths La and Lb between the reference level 102 of each of the rods and the grooves 104 of the stop means of each of these rods, which are composed of the sum of a variable distance, viz., the heights Ha and Hb of each of the pellet columns 6a and 6b, and on the other hand a constant distance, except for the manufacturing tolerances, viz., the distance between the bottom face of each of the stop means and the groove 104, are variable. Thus, in the example described, there is a difference of 40 mm between La and Lb.

Consequently, it is apparent that, if it is desired to perform an operation of setting the tubular element 2 at the level of each of the grooves 104 of the rods represented in FIGS. 5 and 6, these setting operations must be performed opposite (i.e., at the level of) the grooves 104. In other words, in the case of the fuel rod of FIG. 5, this setting operation must be performed at a distance equal to La from the reference level 102. On the other hand, in the case of the rod represented in FIG. 6, this setting operation will have to be performed at a distance Lb from the reference level 102. Consequently, it will first be desirable to detect the actual position of the annular groove 104, this position being, as has just been shown, subject to variations that can amount, for example, to as much as 40 mm. After having detected the actual position of the groove 104, the tool of the setting machine should be placed opposite the groove 104 before performing the setting operation properly so called.

It will be understood that a lengthening of time results therefrom, and consequently an increase in the cost of the fuel rod thus made.

In FIGS. 7, 8 and 9 are shown the different steps of the process of setting a stop means inside of a tubular element in accordance with the invention.

First of all, the stop means, preferably upon its insertion into the tubular element 2, is represented in FIG. 3 and, in a variant embodiment, in FIGS. 4. It has the form of a hollow cylinder. It is made of a plastically deformable material. Its peripheral walls are sufficiently thin for it to be possible to deform them plastically without applying appreciable effort. In the embodiment shown in FIG. 3, the stop means 12 has rounded ends 15 at the center of which are the orifices 14. However, this stop means can obviously have other configurations, such as for example the one represented in FIG. 4.

The length of this element is at least equal to a predetermined distance, this distance being the distance between two limits, for example an upper limit and a lower limit, of the positioning of the stop means inside of the tubular element 2, as it will be explained in greater detail below. Preferably, the length of the stop means is at least equal to this predetermined distance plus twice the length necessary for making a setting groove. It will be noted that, in each of FIGS. 3 and 4, the stop means 12 has been represented undeformed. In other words, it does not include any previous setting groove, unlike the stop means 100 described in conjunction with the prior art in FIGS. 5 and 6, which does include a previously machined groove 104.

In FIG. 7, the stop means is introduced into the tubular element 2, this stop means being undeformed, that is, it has no previously made groove. Then (FIG. 8) the said tubular element is positioned such that one reference surface of this element is situated between two predetermined limits for the positioning of the element 12. In the embodiment represented, the bottom surface 112 of the stop means 12 has been chosen as the reference surface for positioning the latter, if it is assumed that, in each of FIGS. 7 to 11, the fuel rod is represented in the vertical position. This being the case, the two limits 114 and 116 for the positioning of the means constitute a lower limit 114 and an upper limit 116.

It should be noted that the positioning limits 114 and 116 are marked off with respect to a selected reference on the tubular element 2. This reference can be, for example, a reference level 102, in a manner identical to that described in conjunction with FIGS. 5 and 6. This reference level could be materialized for example by a slight indentation of the can 2 so as to form an inward projection.

By way of example, the distance between the reference level 102 and the lower positioning mark or position 114 can be selected to be equal to 980 mm, whereas the distance between the reference level 102 and the upper position mark 116 can be selected to be equal to 1,020 mm. Thus, the distance d between the references 114 and 116 will be 40 mm. Considering what has been said before concerning the length of the spacer, the latter must be at least equal to 40 mm. It will be, for example, on the order of 60 mm in order to provide sufficient margin for the achievement of a setting groove, as will be explained hereinbelow.

The limits 114 and 116 are selected as desired, in accordance with the user's needs and the needs of the application of the stop means. If for example the tubular element is the can of a nuclear reactor fuel rod, and if the stop means is intended for fixing a column of fissile and/or fertile pellets contained in this can, the method of the invention for affixing a stop means to a tubular element will find an advantageous application.

Indeed, as explained previously, the fuel pellets are subject to manufacturing tolerances, such that the actual height of a column of pellets is subject to variations. In other words, the height of this column will differ from one fuel rod to another, the limits of this variation being determined by the manufacturing tolerances of the pellets. Thus, to return to the example given before, the lower and upper limits of the height H of a column of pellets can be 980 and 1020 mm.

In FIG. 10, there is represented schematically a nuclear reactor fuel rod comprising a column of pellets 6a whose height Ha, by random effect, is equal to the maximum height, allowing for the manufacturing tolerances. This height Ha can therefore be on the order of 1020 mm.

On the other hand, there is shown in FIG. 11 a nuclear reactor fuel rod having a pellet column 6b whose height Hb is close to the minimum height of a pellet column including the manufacturing tolerances. This height will therefore be on the order of 980 mm. Thus, the lower limit for the positioning of the spacer will be given by the distance of 980 mm from the reference level 102, whereas the upper limit 116 of the spacer positioning will be given by a distance of 1020 mm from the reference level 102. It will be noted that it is not necessary for these lower 114 and upper 116 positioning limits to be marked or materialized along the length of the tubular element 2.

In accordance with the invention, one chooses to give the stop means 12 a height (length) that is at least equal to the distance between the limits 114 and 116. In other words, this height must be at least equal to 40 mm. For example, a height h equal to 60 mm will be chosen.

Furthermore, again in accordance with the invention, the predetermined level or position will be selected at which the simultaneous operation of setting the can and the stop means will be performed at an appropriate distance R from the reference level 102. This predetermined position must be at least equal to the distance between the level 102 and the upper positioning limit for the spacer plus an amount to allow for the distance needed on the stop means for forming a setting groove—for example 10 mm. Therefore, R can be selected to equal 1020 mm + 10 mm = 1030 mm.

In FIG. 10, the height Ha is equal to 1020 mm, whereas the distance R is equal to 1030 mm. The setting groove 120 will therefore be made at the predetermined level R and therefore will be 10 mm from the bottom surface 112 of the stop means.

On the other hand, in the example of FIG. 11, the height Hb of the pellet column is equal to 980 mm. By making a setting groove simultaneously in the tubular element and in the stop means 12 at the predetermined level R, which is not changed although the pellet height is not the same, the setting groove 122 will be made at a distance of 50 mm from the bottom face 112 of the stop means. Since the total length of the stop means is 60 mm, it can be deduced that this groove 122 is situated 10 mm from the other face (reference 124) of the stop means, which is sufficient for performing the setting operation.

It is therefore seen that, in accordance with the invention, the setting grooves 120 and 122 have been made at a predetermined distance R, or 1030 mm, from a reference level 102 selected along the length of the tubular element 2 in accordance with the user's needs, without the need to detect the actual height Ha or Hb of the pellet column 6, and without the need to adjust the position of the tool of the setting machine when one changing from one rod to another. The result, therefore, is a saving of time and consequently an appreciable reduction of cost.

We claim:

1. Method of affixing a stop means to the inside of a nuclear reactor fuel rod can having a length, said method being characterized in that:

the said stop means is a hollow cylinder of deformable but undeformed walls;

the said nuclear reactor fuel rod can has a deformable wall, but it is likewise undeformed;

and in that it includes the following successive steps:

providing a reference mark or level at a certain point along the length of the can;

introduction of said undeformed stop means into the nuclear reactor fuel rod can;

positioning a reference surface of said undeformed stop means inside of the nuclear reactor fuel rod can between an upper and a lower predetermined positioning limit, or at least level with said upper positioning limit, each of said upper and lower predetermined positioning limit being located at a predetermined distance, respectively, from said reference mark or level; and performing a simultaneous operation of setting the nuclear reactor fuel rod can and the stop means at a position located at a predetermined distance from said predetermined mark or level along the length of the said nuclear reactor fuel rod can;

the stop means having a length at least equal to the distance between the said upper and lower predetermined limits.

2. Method of affixing a stop means to the inside of a nuclear reactor fuel rod can having a length, and wherein said fuel rod comprises a column of fuel pellets and/or of fertile pellets having two ends, the said column having a height comprised between two limits, and there is a stop means being placed in abutment against each of the two ends of the column of pellets, said method being characterized in that:

the said stop means is a hollow cylinder of deformable but undeformed walls;

the said nuclear reactor fuel rod can has a deformable wall, but it is likewise undeformed;

and in that it includes the following successive steps;

providing a reference mark or level at a certain point along the length of the can;

introduction of said undeformed stop means into the nuclear reactor fuel rod can;

a reference surface of said undeformed stop means inside of the nuclear reactor fuel rod can between an upper and a lower predetermined positioning limit, or at least level with said upper positioning limit, each of said upper and lower predetermined positioning limit being located at a predetermined distance, respectively, from said reference mark or level; and performing a simultaneous operation of setting the nuclear reactor fuel rod can and the stop means at a position located at a predetermined distance from said predetermined mark or level along the length of the said nuclear reactor fuel rod can;

the stop means having a length at least equal to the distance between the said upper and lower predetermined limits.

* * * * *